United States Patent [19]
Krogager

[11] Patent Number: 4,905,856
[45] Date of Patent: Mar. 6, 1990

[54] METHOD TO JOIN END FITTINGS IN A PRESSURE VESSEL AND PRESSURE VESSELS FABRICATED ACCORDING TO THE METHOD

[75] Inventor: Max Krogager, Linköping, Sweden

[73] Assignee: SAAB Composite Aktiebolag, Linkoping, Sweden

[21] Appl. No.: 238,342

[22] PCT Filed: Mar. 9, 1987

[86] PCT No.: PCT/SE87/00116
§ 371 Date: Aug. 26, 1988
§ 102(e) Date: Aug. 26, 1988

[87] PCT Pub. No.: WO87/05261
PCT Pub. Date: Sep. 11, 1987

[30] Foreign Application Priority Data
Mar. 10, 1987 [SE] Sweden ............... 8601080

[51] Int. Cl.$^4$ ............................. B65D 1/16
[52] U.S. Cl. ........................ 220/3; 220/414
[58] Field of Search .................. 220/414, 3

[56] References Cited
U.S. PATENT DOCUMENTS

| | | | |
|---|---|---|---|
| 2,744,043 | 5/1956 | Ramberg | 220/3 |
| 2,848,133 | 8/1958 | Ramberg | 220/414 |
| 3,144,952 | 8/1964 | Uhlig et al. | 220/3 |
| 3,282,757 | 11/1966 | Brussee | 156/69 |
| 3,303,079 | 2/1967 | Carter | 220/3 |
| 3,449,182 | 6/1969 | Wiltshire | 156/69 |
| 3,765,557 | 10/1973 | Giwer | 220/3 |
| 4,459,171 | 7/1984 | McKinney | 156/425 |
| 4,714,094 | 12/1987 | Tovagliaro | 220/414 |
| 4,778,073 | 10/1988 | Ehs | 220/414 |

FOREIGN PATENT DOCUMENTS

| | | | |
|---|---|---|---|
| 2516398 | 11/1975 | Fed. Rep. of Germany | 220/3 |
| 1274842 | 2/1962 | France . | |
| 1255738 | 12/1971 | United Kingdom . | |

*Primary Examiner*—A. Michael Chambers
*Attorney, Agent, or Firm*—Lowe, Price, LeBlanc, Becker & Shur

[57] ABSTRACT

A pressure vessel of composite material built up by fiber wound around an elongated hollow body having at least one end fitting with an axially extending peripheral surface which has a plurality of protrusions distributed over the surface with portions of the fiber material passing over the end fitting and applied around the protrusions as to be peripherally and axially distributed thereover and molded into the composite material. The pressure vessel may also include two end fittings with different radii with the body having on an axially limited portion thereof radially extending pin-like protrusions distributed around its circumference with the fibers being wound in different directions relative to the axis on opposite sides of the protrusions with the directions being adapted to the radii of the end fittings.

2 Claims, 2 Drawing Sheets

METHOD TO JOIN END FITTINGS IN A PRESSURE VESSEL AND PRESSURE VESSELS FABRICATED ACCORDING TO THE METHOD

The present invention relates to a method of joining an end fitting into a pressure vessel built up by composite material by a winding procedure, said end fitting having an axially extending peripheral surface having protrusions distributed along it preferably grooves going around the surface and which together with a body part that is attached to the end fitting is rotated around, an axis extending centraly through the end fitting, wherein the fibres or bunches of fibres being part of the composite material, are wound in continous turns which become joined to each other and to the body by hardening material.

A field of application for pressure vessels is trucks and buses. On each wehicle there is one or more pressure vessels, usually manufactured of steel plate, intended for accumulation of pressure air or hydraulic fluid. The mechanical environment is severe and corrosion is also a problem. The use of fibre reinforced vessels is an excellent solution to both of these problems. In addition a weight reduction is normally achieved, which always is welcome in different kinds of vehicles.

However, to be installed in a pressure system, fibre reinforced pressure vessels have to be provided with at least one end fitting where connection can be made. Such an end fitting usually consists of metal or any other hard, homogeneous and workable material. The mounting of the end fitting is performed in the winding procedure by letting the fibres pass the end fitting so that, it will be wound into the end portion of the pressure vessel. The known technique is that the end fitting usually is provided with a flange located at the part of the end fitting which is located inside the pressure vessel. Therefore the flange, after the winding is finished, will bear against the inner edge of the end opening in the pressure vessel while the smaller part directed outwards passes through the wound and moulded mass of fibres.

By pressurizing the vessel the end fitting will be forced in direction outwards from the vessel but will be held partly by adhesion to the fibre mass impregnated with thermosettling plastics, partly by the flange being supported by the inside of the end of the pressure vessel. Hereby large shearing forces arise in the fillet of the end fitting located between the flange and the peripheral surface of the outwards directed part. At varying pressure forces fatigue breakdown can occur whereby the whole flange will be sheared off from the end fitting and the pressure vessel will become useless.

At a rapid, large pressure increase it can happen before fatigue breakdown occurs, that the fibres in the end of the vessel break off beginning in the vicinity of the fillet of the end fitting. The result can be just as disastrous as that mentioned before since the end fitting is pressed out and demolishes the end portion of the pressure vessel. It is obvious that besides these strength inconviniences such a design will also involve a risk of personel injuries.

The problems mentioned above basically have their origin in strain concentrations occuring in the end fitting as well as in the fibre mass in the vicinity of the fillet between the flange and the peripheral surface. The solution of the problem presented by this invention is to perform the joining of end fittings in the pressure vessel so that the above mentioned strain concentrations are avoided.

An object of the present invention is to achieve a favourable distribution of the forces in the boundary layer between the end fitting and the fibre winding. Another object is to join end fittings, having no flanges, in such a manner that the fibre material is secured to the end fittings. A further object of the invention is to provide a method to safely join end fittings of considerably different radii.

These objects are achieved by giving the method and the pressure vessel according to the invention the characteristics brought out in the claims hereinafter.

The invention will now be discribed in more detail with reference to the attached drawings.

A fibre wound pressure vessel is produced by winding a bunch of fibres, e.g. carbon or glass fibres, on a body, a so-called liner, and continuously adding therewith a liquid thermosetting plastic. The fibres or bunches of fibres are wound in specific patterns to achieve maximum strength in the fibre structure. According to one method winding is performed by clamping the center of one of the ends of the liner, alternatively both ends thereof, into a winding machine, and thereafter rotating the liner around its center axis while the fibres are guided in the desired pattern by passing an eye movable in parallel to the center axis. Another winding method is to clamp the liner in a multiple axis manipulator, being controlled e.g. by a computer programme, and causing the liner to move in a pattern controlled by the programme, whereby the fibres run through a fixed eye.

Figure 1:
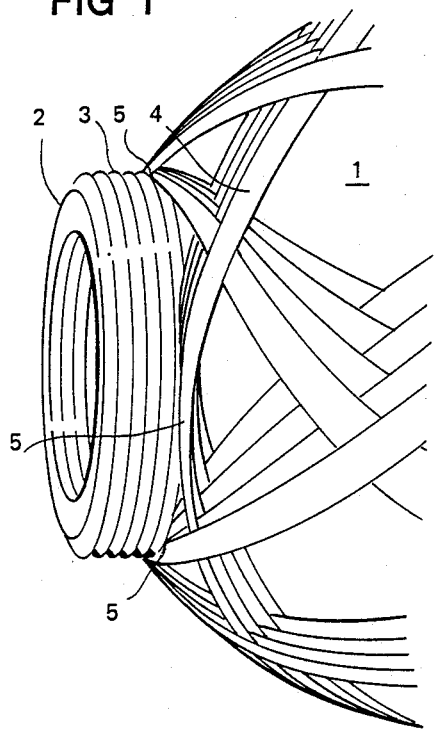
FIG. 1 illustrates a pressure vessel having an end fitting joined therein according to the invention. The figure shows the beginning of the fibre winding.
Figure 2:
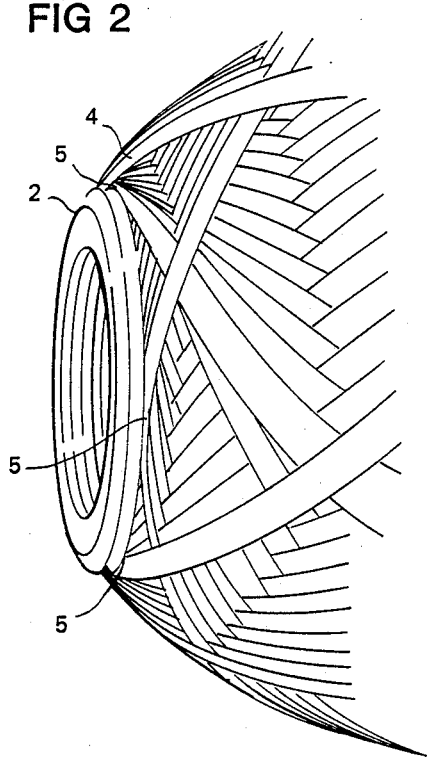
FIG. 2 illustrates the same object at the completion of the fibre winding.

FIG. 1 is shown one end of a body or liner 1 having an end fitting 2 joined therein the end fitting has a plurality of protrusion 3 distributed all over its peripheral surface. The protrusions have the form of turned grooves or threads but can also have the form of pins or spikes.

Figure 3:
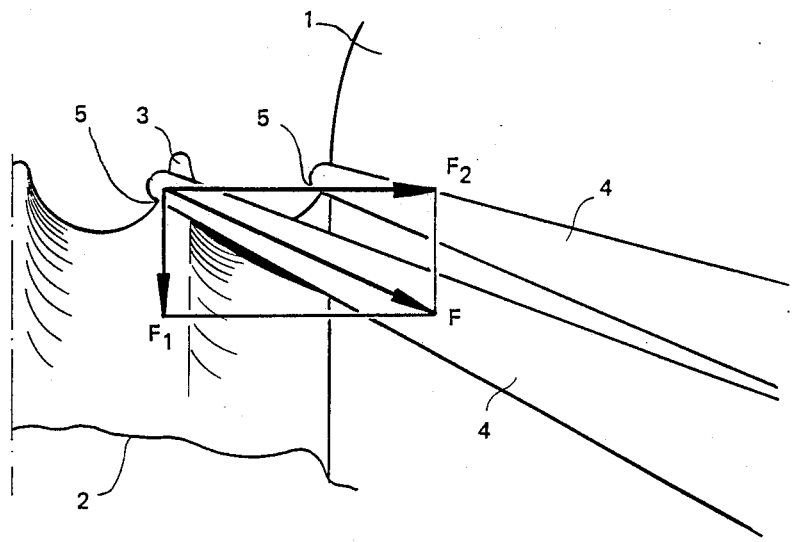
FIG. 3 illustrates at a larger scale, a detail of an end fitting during the winding.

The object of the protrusions is to catch the fibres 4 or bunches of fibres when they during the winding pass the end fitting, to thereby accomplish a contact point 5 which for every turn is displaced along the peripheral surface. The tension F, see FIG. 3, acting on the fibres or bunch of fibres which for the moment is applied to the end fitting 2 and is bent over its peripheral surface, gives radially directed component forces $F_1$ and axially directed component forces $F_2$ which are shown in the figure. The component forces $F_1$ are of special interest as they will grow and squeeze the end fitting when the vessel is set under pressure. The component forces $F_2$ will also grow and cause counterforces to those tending to press the end fitting away from the pressure vessel.

If no protrusions were made the above force activity relative to the end fitting would not occur but instead the tensions would be concentrated to the boundary surface between the thermoplastic moulded fibres and the surface of the end fitting where separation between the materials could occur already at a medium pressure.

By arranging the winding programme so that when the wall of the pressure vessel is built up, the contact points 5 of the bunch of fibres being wound are moved axially more and more towards the end of the end fitting, thereby causing more and more protrusions to be moulded into the wall, the holding forces that arise will be equally distributed over the whole boundary surface between the wound material and the end fitting. As the end fitting has no flange, the strain concentration mentioned above in the fillet will be eliminated and instead the tensions will be equally distributed over the boundary surface between the fibre material and the peripheral surface of the end fitting, said boundary surface being enlarged here due to protrusions.

Figure 4:
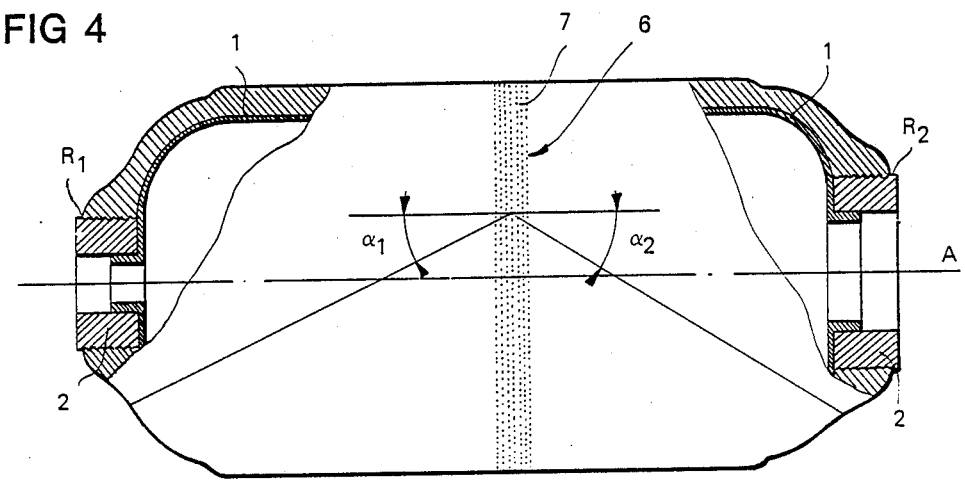
FIG. 4 is a view of a pressure vessel, partly cut up, having two end fittings of different radii joined therein and comprising a device for adapting the fibre direction.

In FIG. 4 a pressure vessel is shown in which two end fittings 2 with the radii $R_1$ and $R_2$ are joined. For the purpose to adapt at the winding the direction of the fibres or the bunches of fibres to the radii of the end fittings, the liner is before the winding procedure provided with a large number of radially pointing pin-like protrusions 7 which are arranged in a band-like portion 6 going around the liner.

During the winding the unwound part of the bunch of fibres is caused to have a specific angle $\alpha_1$, when it leaves e.g. the end fitting with the radius $R_1$. To reach the other end fitting with the radius $R_2$, which is considerably greater than $R_1$, in a way that will cause the bunch of fibres to be laid over the last mentioned end fittning and as described above, be fixed in the contact points 5, the angle has to be changed to $\alpha_2$ according to a preferred embodiment of the invention. If this should take place without fixing the bunch of fibres to a pin-like protrusion 7 the bunch of fibre should slide away from its right position at the end fitting having the radius $R_1$.

The pin-like protrusions 7 ought to be of a height being equal to or a bit higher than the thickness of the completed wall of the pressure vessel, so that also the directions of the last attached bunches of fibres can be adapted to the end fittings.

The protrusions 7 can be mounted on the liner in different ways. The can e.g. be applied on a stripe which is glued to the liner surface. The protrusions can also be moulded integrally with the liner.

I claim:

1. A pressure vessel of composite material comprising a body having an axis with fiber material wound around said body and including at least one end fitting having an axially extending peripheral surface including a plurality of protrusions distributed over said surface, characterized in that portions of said fiber material pass over at least a portion of said peripheral surface of said end fitting and are applied around said protrusions with peripheral and axial distribution over said peripheral surface, said portions of said fiber material being moulded and fixed into said composite material.

2. A pressure vessel according to claim 1 wherein said vessel includes two end fittings with different radii, characterized in that said body on an axially limited portion thereof has radially extending pin-like protrusions distributed around the circumference thereof, fibers or bunches of fibers comprising said fiber material being wound in different directions relative to said axis on opposite axial sides of said protrusions, wherein the directions are adapted to the radii of said end fittings.

* * * * *